US009004270B2

(12) United States Patent
Cutshall et al.

(10) Patent No.: US 9,004,270 B2
(45) Date of Patent: Apr. 14, 2015

(54) LINK BELT FOR USE IN FURNACES

(76) Inventors: Robert S. Cutshall, Kalamazoo, MI (US); Brett A. Cutshall, Battle Creek, MI (US)

( * ) Notice: Subject to any disclaimer, the term of this patent is extended or adjusted under 35 U.S.C. 154(b) by 446 days.

(21) Appl. No.: 13/128,416

(22) PCT Filed: Dec. 4, 2009

(86) PCT No.: PCT/US2009/066796
§ 371 (c)(1),
(2), (4) Date: Jun. 9, 2011

(87) PCT Pub. No.: WO2010/065869
PCT Pub. Date: Jun. 10, 2010

(65) Prior Publication Data
US 2011/0226592 A1    Sep. 22, 2011

Related U.S. Application Data

(60) Provisional application No. 61/119,908, filed on Dec. 4, 2008.

(51) Int. Cl.
*B65G 17/06* (2006.01)
*B65G 17/40* (2006.01)
*B65G 17/08* (2006.01)
*F27B 9/24* (2006.01)
*F27B 21/06* (2006.01)
*F27D 99/00* (2010.01)

(52) U.S. Cl.
CPC ............... *B65G 17/40* (2013.01); *B65G 17/08* (2013.01); *F27B 9/243* (2013.01); *F27B 21/06* (2013.01); *F27D 99/00* (2013.01)

(58) Field of Classification Search
USPC ................ 198/822, 838, 845, 850, 851, 853; 432/239; 474/212, 207, 227, 228
See application file for complete search history.

(56) References Cited

U.S. PATENT DOCUMENTS

| | | | |
|---|---|---|---|
| 1,926,126 A | 9/1933 | Tuttle et al. | |
| 1,930,584 A | 10/1933 | Cope et al. | |
| 2,006,612 A | 7/1935 | Williams | |
| 2,045,646 A * | 6/1936 | Harris | 432/245 |
| 2,229,106 A * | 1/1941 | Lomando | 474/220 |
| 2,681,728 A | 6/1954 | Boron | |
| 2,708,107 A | 5/1955 | Holcroft et al. | |
| 2,915,909 A * | 12/1959 | Boron | 474/227 |
| 2,955,812 A | 10/1960 | Boron | |
| 2,994,917 A | 8/1961 | Fritsch | |
| 3,363,952 A | 1/1968 | Paterson | |
| 3,535,946 A | 10/1970 | Miller | |
| 4,556,142 A * | 12/1985 | Lapeyre | 198/822 |
| 4,618,056 A * | 10/1986 | Cutshall | 198/853 |
| 5,199,868 A | 4/1993 | Autenrieth | |
| 5,558,204 A | 9/1996 | Daringer | |
| 5,573,105 A | 11/1996 | Palmaer | |

(Continued)

FOREIGN PATENT DOCUMENTS

GB    1301655    1/1973

*Primary Examiner* — William R Harp
(74) *Attorney, Agent, or Firm* — Varnum, Riddering, Schmidt & Howlett LLP

(57) ABSTRACT

A link belt for use in a sintering furnace, which is made of a plurality of first links, each of said links having working surfaces for supporting objects to be carried on the belt. A plurality of rollers are positioned intermediate certain of said first links, and a plurality of pins pass through apertures within said first links and within said rollers.

3 Claims, 7 Drawing Sheets

(56) References Cited

U.S. PATENT DOCUMENTS

| 6,059,097 | A | 5/2000 | Clopton |
| 6,585,110 | B2 | 7/2003 | Layne |
| 7,111,725 | B2 | 9/2006 | Marshall et al. |
| 2003/0075419 | A1 | 4/2003 | Layne |

* cited by examiner

LINK BELT FOR USE IN FURNACES

CROSS-REFERENCE TO RELATED APPLICATIONS

This is a National Stage filing which is based upon and claims benefit of PCT Application No. PCT/US09/066796, filed Dec. 4, 2009, and is based upon and claims benefit of U.S. Provisional Patent Application Ser. No. 61/119,908 filed Dec. 4, 2008, which is hereby incorporated herein by reference.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO A SEQUENCE LISTING

Not Applicable.

BACKGROUND OF THE INVENTION

1. Field of the Invention

The invention relates to a link belt for use in a continuous furnace and, more particularly, link belts having roller configurations.

2. Background Art

It is known to advantageously treat various articles by subjecting the articles to high temperatures for preselected periods of time. Such treatment may, for example, effect sintering of articles which are made by compacting powdered refractory metals or ceramics. In this regard, some of these processes include method steps where the articles are transported through a heat treating zone in a furnace, rather than being loaded and unloaded in batches.

For example, it is known to transport articles through heating zones on link belts made of wire which are formed by conventional belt links. Somewhat similar to a wire belt is a transport belt disclosed in Miller, Jr. et al., U.S. Pat. No. 3,535,946 issued Nov. 15, 1995. The Miller, Jr. et al. patent discloses a belt made up of a succession of interwoven links, with each of the links formed of a length of tungsten wire which has been treated to a temperature of at least 400° C. The links are wound around an elliptical mandrel so as to provide, when cooled, a link which is in the form of a slightly flattened helix. Miller, Jr. et al. further disclose that they believe that by the avoidance of sharp bends in the link form and by the provision of a large number of interlocking contact points between links, strength and failure resistance are improved.

Autenrieth, et al. U.S. Pat. No. 5,199,868 issued Apr. 6, 1993 discloses a continuous furnace which serves for the simultaneous two-sided sintering of sintered sheets upon substrates. The furnace of Autenrieth, et al. includes a muffle and a conveyor belt longitudinally traversing the muffle and carrying the substrates. The belt consists of a pair of individual belts which are guided in parallel next to each other in a synchronous manner. The belt surfaces are mutually inclined at a small angle to the horizontal in the muffle. The substrates are self supporting between two parallel lateral edges. The substrates lie with one lateral edge on the belt surface of one belt and with the second lateral edge on the belt surface of the other belt. In this manner, the bottom side of each substrate does not touch the individual belts.

Fritsch, U.S. Pat. No. 2,994,917 issued Jul. 28, 1954 discloses an apparatus for converting metal powder into wrought metal shapes comprising at least one pair of oppositely disposed and laterally spaced vertical compactor elements. Each of the compactor elements includes an endless link belt mounted to travel about a pair of support wheels. The adjacent outer surfaces of the link belt form substantially continuous pressure surfaces inclined at an acute angle to the common axis of the pair of compactor elements. The adjacent pressure surfaces define a truncated V-shaped passageway. Means are provided for moving the link belt at the same rate of speed and in opposite directions so that the adjacent pressure surfaces travel uniformly toward the narrow end of the passageway defined by the compactor elements. In this manner, loose metal powder is compacted into a precompressed strip having sufficient mechanical strength to retain its form. This strip is introduced into a pair of pressure rolls. A power feed hopper is adapted to introduce loose metal powder into the wide end of the passageway. A pair of oppositely disposed pressure rolls having the axis of the rolls disposed in a horizontal plane define a roll gap with a width which is less than the width of the narrow end of the passageway.

Daringer, U.S. Pat. No. 5,558,204 issued Sep. 24, 1996 describes a weld-free belt assembly in which elongated length modules are coupled in widthwise and side-by-side relationships by transversely-oriented coupling modules. An internal cavity is defined within each link along with a surface configuration on each side of the link. This configuration defines an entry access portion for a coupler and slot portions for enabling relative longitudinal movement of the coupler, while retaining the coupler within the internal cavity. The interfitting coactions of the links and couplers enable an assembled belt to move from linear planar travel into a curved path so as to establish an endless belt configuration. Relative movement of the couplers within a link cavity enables longitudinal collection of links along the inner circumference when the belt enters a curvilinear travel path in approximately the same plane, and enables re-extension for return to linear travel. An assembled belt can be driven longitudinally by sprockets. Also, the belt can be driven along a serpentine path by lateral-edge dynamic frictional drive. Alternatively, a similarly driven and layered helical-path "carousel" arrangement can be used. Special configuration lateral-edge links provide protrusion-free lateral edge surfaces enabling smooth dynamic frictional drive along inner circumference surfaces during curvilinear travel.

BRIEF DESCRIPTION OF THE SEVERAL VIEWS OF THE DRAWING

The invention will now be described with respect to the drawings, in which.

DETAILED DESCRIPTION OF THE INVENTION

Figure 1:
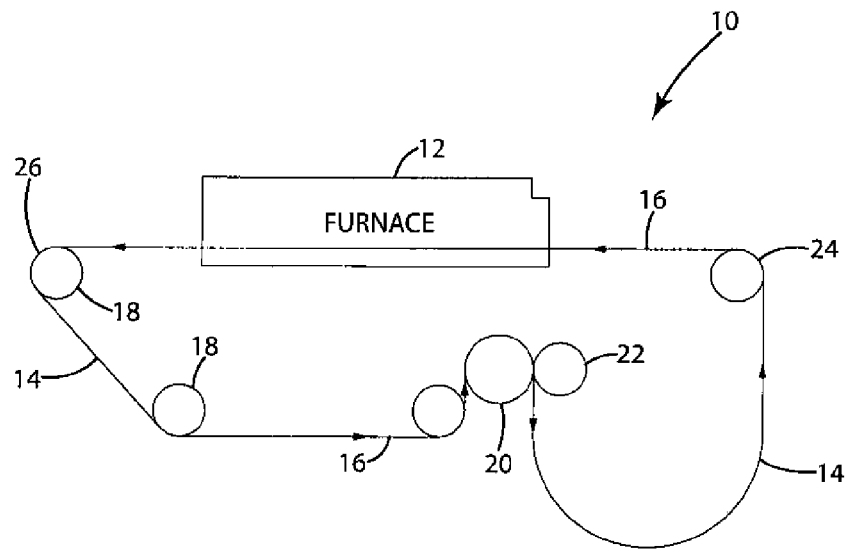
FIG. 1 is a partially schematic and partially diagrammatic view of a sintering furnace with which a link belt may be used in accordance with the invention.

The principles of the invention will now be described, with respect to a sintering furnace 10 and a link belt 14 as illustrated in FIGS. 1-20. Advantageously and in accordance with various aspects of the invention, the link belt overcomes relatively high friction due to its roller configuration. In addition, as a result of the link belt in accordance with the invention having a relatively flat upper surface 142 (comprising lateral surface 144 and longitudinal surfaces 146) and offset rollers 128, larger parts are allowed to be placed on the belt. Still further, the offset rollers allow for use in current furnaces which use friction drives. The belt uses rollers 128 which can be formed of ceramic material. The use of the ceramic precludes spot welding of the rollers 128 to the pins 132. Still further, the use of ceramic material for the rollers avoids the potential for "stiction" if the belt is stopped while under relatively high temperatures. The belt links can be constructed of iron-nickel super alloys or other suitable metal. This type of construction will maintain relatively high strength, while also maintaining relatively better ductility than a fully ceramic belt. The belt has a relatively lower initial cost of ownership than belts which consist of wire mesh systems, or which otherwise consist of fully ceramic systems.

Turning to FIG. 1, the drawing illustrates a sintering furnace system 10. The furnace system 10 includes a sintering furnace 12. It should be emphasized that link belts in accordance with the invention may be utilized with apparatus other than sintering furnaces. For background information, sintering consists of a method for making objects from powder, by heating the material (heating below its melting point for solid state sintering) until the particles adhere to each other. Sintering is traditionally used for manufacture of ceramic objects, and also has uses in fields such as metallurgy.

For providing the sintering functions associated with the furnace 12, a link belt 14 is utilized to transport the items to be sintered through the relatively high temperature furnace 12. The link belt 14 can take on any of a number of different configurations, and will move through the furnace 12 in the direction shown by the arrows 16. The link belt 14 itself moves along a path determined by a series of system rollers 18. The drive mechanism for the link belt 14 is provided by a conventional motor drive 20 which exerts forces on the link belt 14 between the motor drive 20 itself and the drive system roller 22. As further shown in FIG. 1, items (not shown) which are to be subjected to the sintering process through the furnace 12 can be placed on the link belt 14 at the charge end 24. Once the sintering process is completed through the furnace 12, the items which have been sintered can be removed at the discharge end 26 of the link belt 14.

Figure 2:
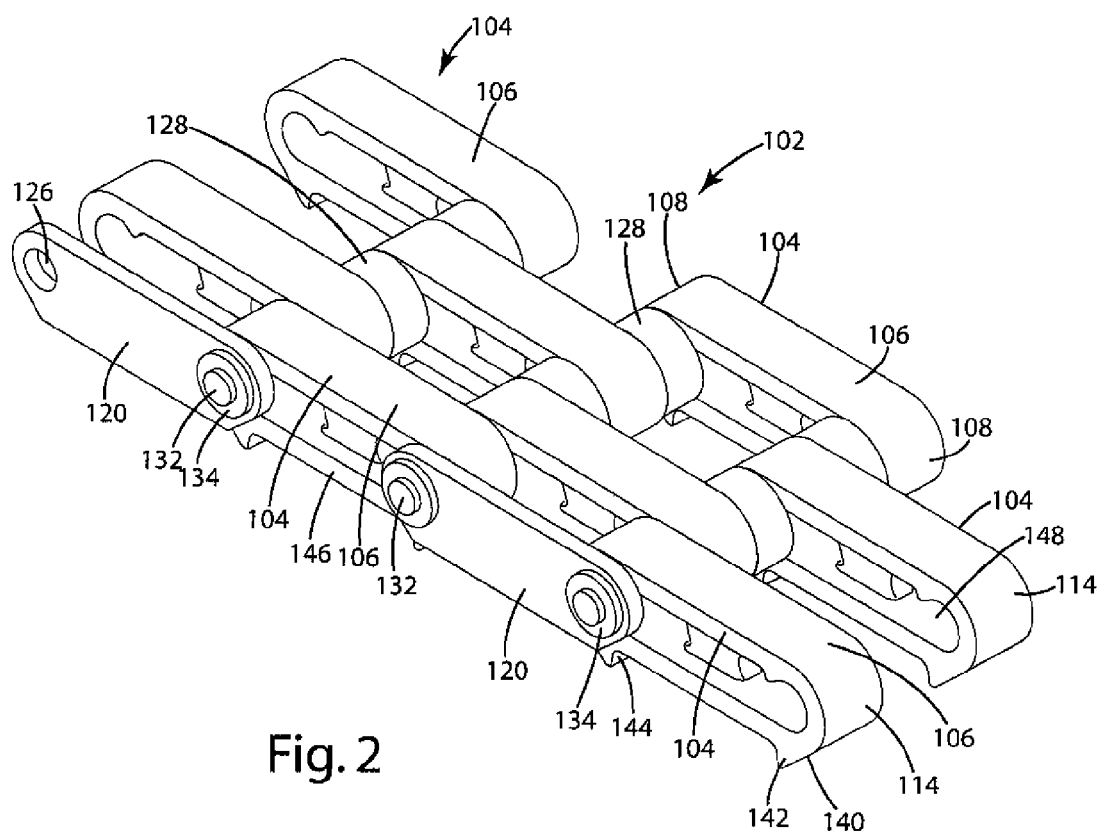
FIG. 2 is an underside, perspective view of a belt section in accordance with the invention.
Figure 6:
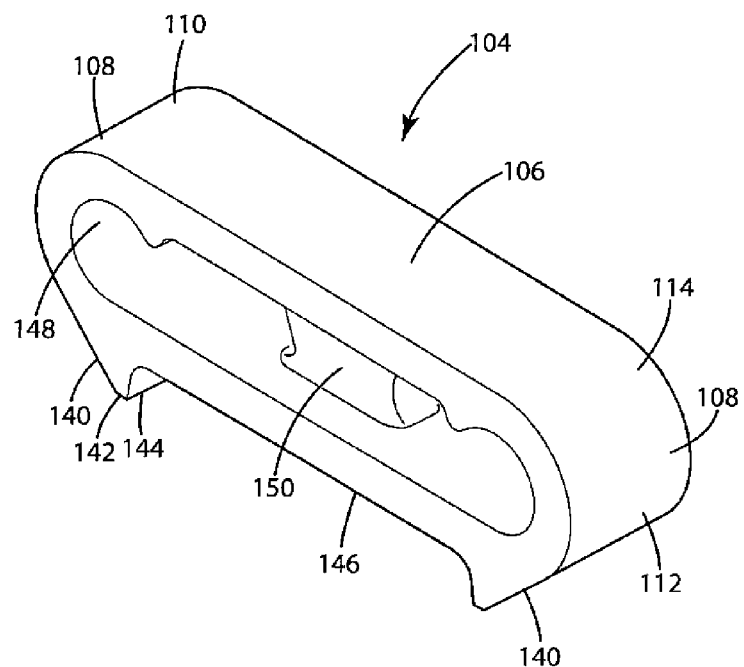
FIG. 6 is an underside, perspective view of a center link of the belt section shown in FIG. 2.
Figure 7:
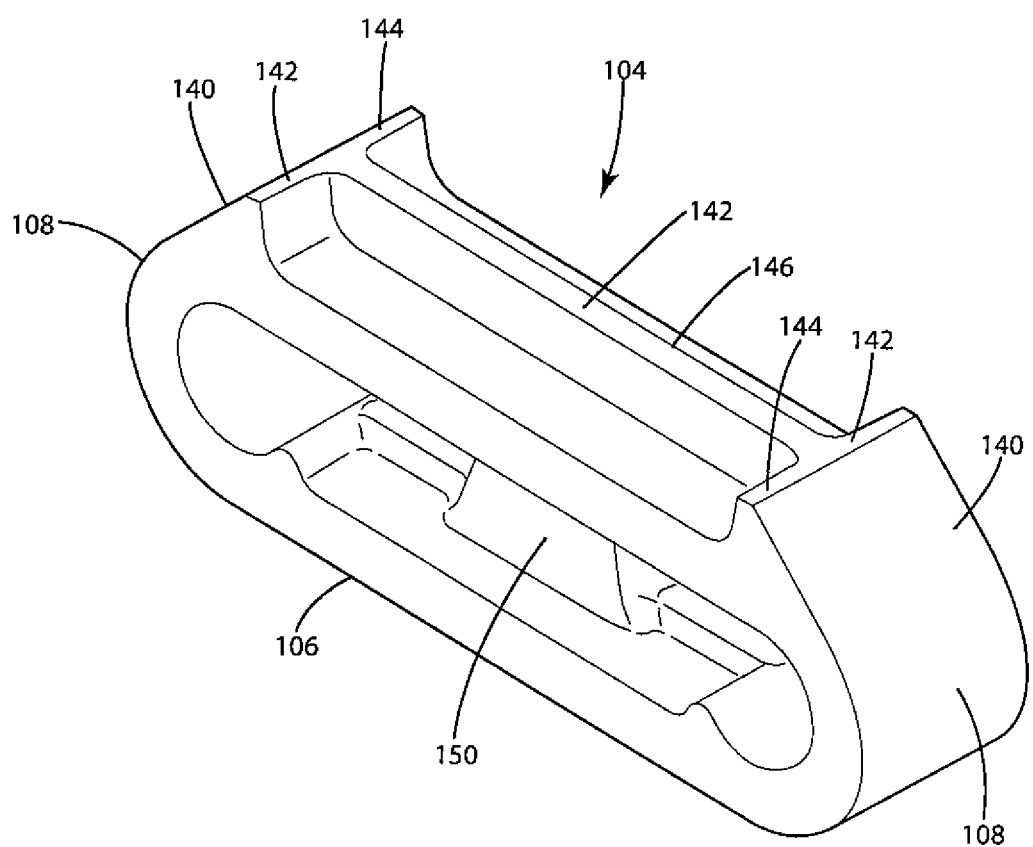
FIG. 7 is an upper, perspective view of a center link of the belt section shown in FIG. 2.
Figure 8:
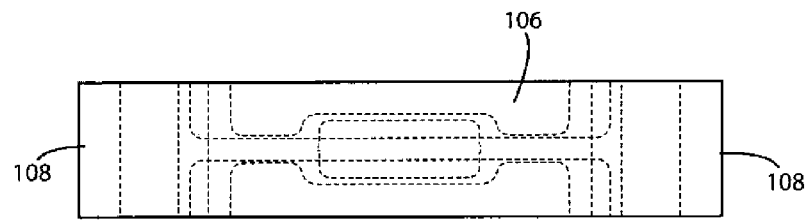
FIG. 8 is a plan view of the center link shown in FIG. 6.

The link belt 14 will now be described with respect to FIGS. 2-20. As shown in FIG. 2, the link belt 14 can include a series of belt sections 102. The belt sections 102 can be linked together in a manner which will be apparent from the subsequent description herein. With reference to FIGS. 2, 3, 4 and 6-13, each of the belt sections 102 can include a series of alloy center links 104, such as shown in the drawings. In the particular belt section 102 shown in FIG. 2, there are 8 center links 104 illustrated. With reference to FIG. 6, each of the center links 104 can include a horizontally disposed bottom section 106. Integral with the horizontal section 106 are a pair of opposing end sections or noses 108. As shown in FIGS. 8-13, the noses 108 include a first end section 110 and a second end section 112. Each of the noses 108 can include a downwardly directed arcuate section 114. In FIG. 6, the first end section 110 includes an arcuate section 114 which curves inwardly toward the horizontal section 106. Correspondingly, the second end section 112 also includes a downwardly directed arcuate section 114 which curves inwardly toward the horizontal section 106. In this manner, the end sections 108 oppose each other.

As each of the arcuate sections depend downwardly, the sections form straight sections 140. The straight sections 140 terminate in what can be characterized as working surfaces 142. The working surfaces 142 act as the actual contact surfaces. These working surfaces 142 are particularly shown in FIGS. 3, 4 and 7. As particularly shown in FIG. 7, the working surfaces 142 include a pair of laterally extending surfaces 144. Integral with the lateral working surfaces 144 is a longitudinally extending working surface 146.

Figure 9:
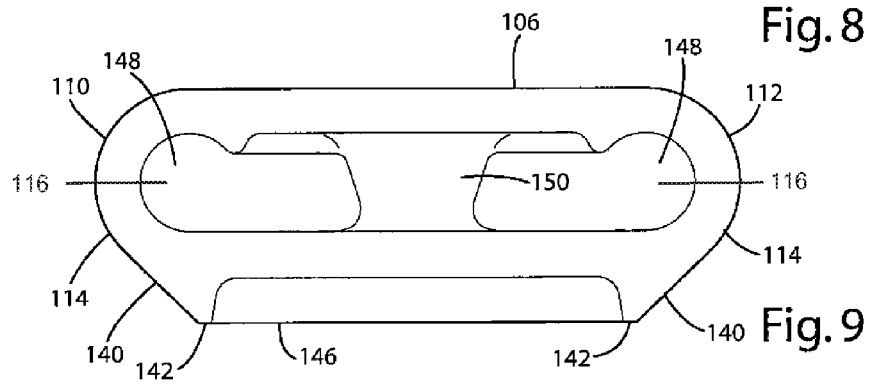
FIG. 9 is a front, elevation view of the center link shown in FIG. 6.
Figure 10:
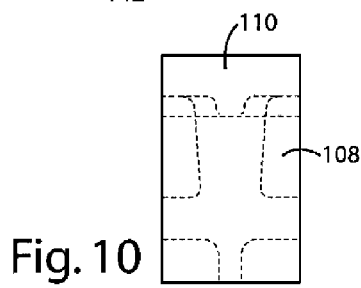
FIG. 10 is a left-side elevation view of the center link shown in FIG. 6.
Figure 11:
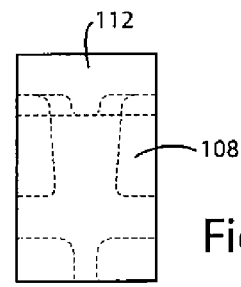
FIG. 11 is a right-side elevation view of the center link shown in FIG. 6.
Figure 12:
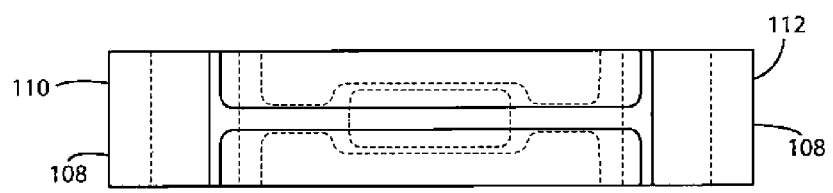
FIG. 12 is an upper side view of the center link shown in FIG. 6.
Figure 13:
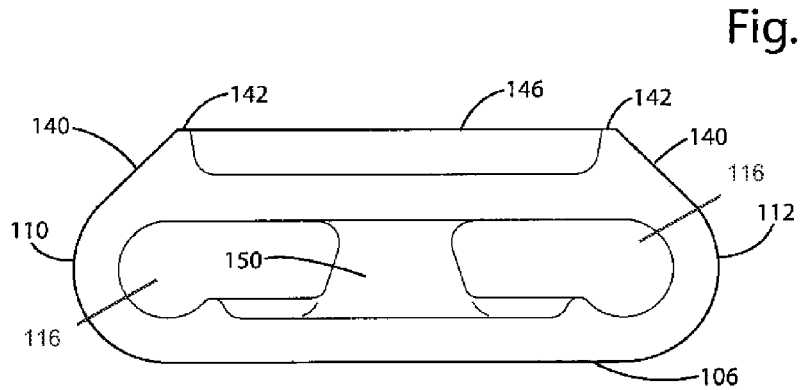
FIG. 13 is an elevation view of the center link shown in FIG. 6.
Figure 14:
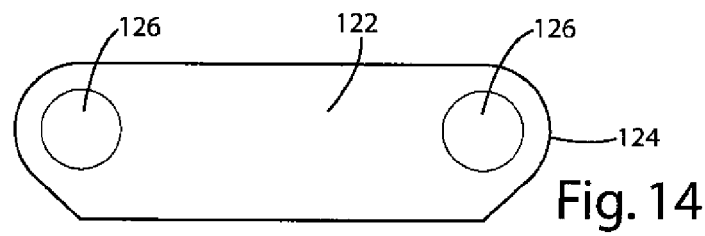
FIG. 14 is a rear, elevation view of a side link of the belt section shown in FIG. 2.
Figure 15:
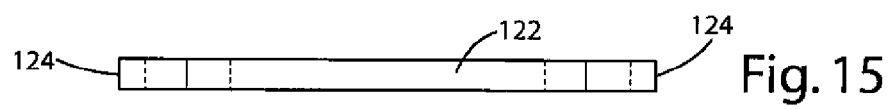
FIG. 15 is a plan view of the side link shown in FIG. 14.
Figures 16, 17, 18:
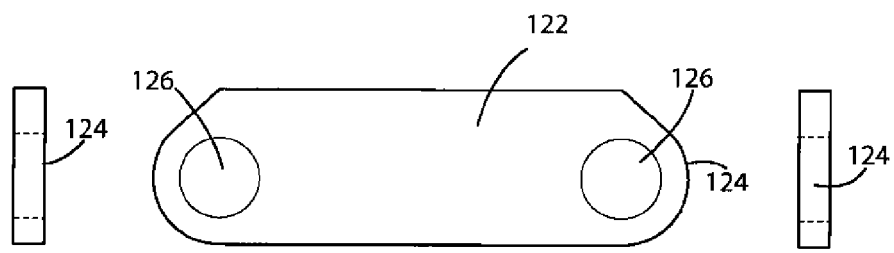
FIG. 16 is a front, elevation view of the side link shown in FIG. 14.
FIG. 17 is a left-side elevation view of the side link shown in FIG. 14.
FIG. 18 is a right-side elevation view of the side link shown in FIG. 14.
Figure 19:
FIG. 19 is a bottom view of the side link shown in FIG. 14.
Figure 20:
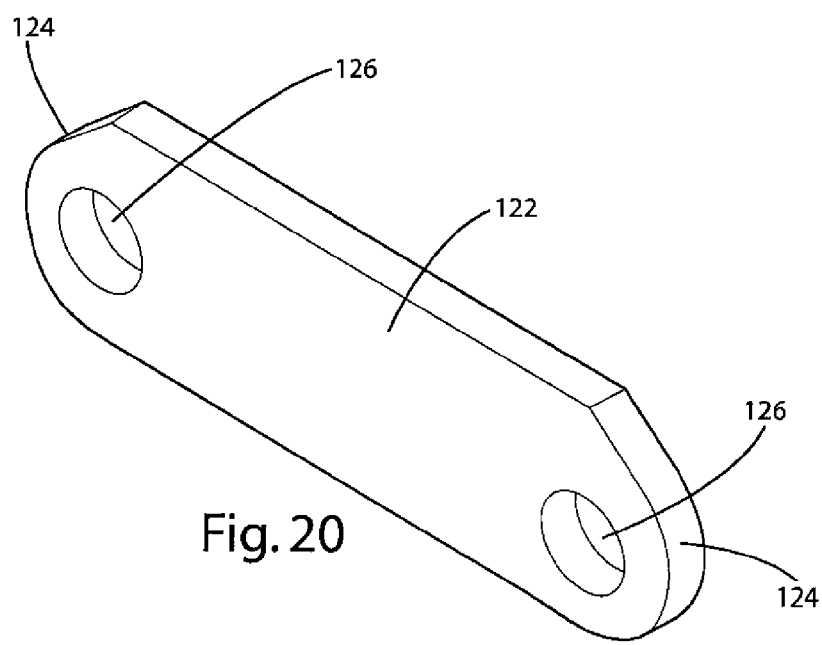
FIG. 20 is a perspective view of the side link shown in FIG. 14.

In addition to the foregoing, and as particularly shown in FIGS. 9 and 13, the arcuate sections 114 and straight sections 140, along with the bottom section 106, form a pair of pin holes 148. The pin holes 148 comprise apertures 116 which are utilized to receive pins as described in subsequent paragraphs herein. In addition to the pin holes 148, each of the center links 144 also include a center post 150. The center post 150 is utilized to provide rigidity and strength to the entirety of the center link 104. With this particular configuration of the center link 104 in accordance with the invention, the link 104 is made relatively light weight by the structure of the link and portions of the structure which essentially comprise hollow interior. Advantageously, and in accordance with certain aspects of the invention, the links 104 may be constructed of iron-nickel super alloys. Such construction will maintain relatively high strength, while also maintaining and facilitating better ductility then may be obtained from a fully ceramic belt. Also, it should be noted that a crown may now exist on the top plates. This avoids any requirement of a corrugated plate, while still using a friction drive.

In addition to the alloy center links 104, the belt section 102 also includes a series of alloy side links 120. In the particular illustration of the belt section 102 shown in FIG. 2, there are two alloy side links 120. However, it should be emphasized that additional side links 120 would exist on the side of the belt section 102 opposing the side on which the side links 120 are shown. The side links 120 will now be described with respect to FIGS. 14-20. With reference thereto, each of the alloy side links 120 includes a vertically disposed central section 122. At opposing ends of the central section 122 are a pair of end sections 124. Each of the end sections 124 has an arcuate-shaped end surface. Formed horizontally through each of the end sections 124 is an aperture 126. The alloy side links 120 are utilized to secure together the alloy center links 104, and the apertures are utilized with alloy pins as described in subsequent paragraphs herein to secure the alloy center links and rollers together on a "widthwise" basis. Each of the alloy side links 120 can also be constructed of iron-nickel super alloys, for maintaining strength and ductility.

Turning again to FIGS. 2-4, each belt section 102 also includes a series of rollers 128. Advantageously, and in accordance with certain aspects of the invention, the belt section 102 essentially is formed of a flat upper surface (through the surfaces 142, 144, 146 of the alloy center links 104) and the rollers 128 are "offset" relative to the belt center links of the section. Such offset rollers 128 can be utilized with current furnaces having friction drives. As shown primarily in FIG. 4, each of the rollers 128 is of a cylindrical configuration and includes an aperture 130 (FIG. 2) extending horizontally therethrough.

The rollers 128 may be formed of various materials. However, advantageously and in accordance with certain aspects of the invention, the rollers 128 may be formed of ceramic materials. Ceramic material has a relatively high thermal conductivity. These materials are used in a number of different types of applications where it is necessary to withstand relatively extreme temperatures. For example, ceramic is often used in disc brakes. In this regard, the use of ceramic for the rollers 128 will tend to avoid spot welding of the rollers 128 to the alloy pins. Further, the rollers 128 will also avoid the potential for "stiction," if the belt 14 for some reason has stopped while under temperature.

Figure 3:
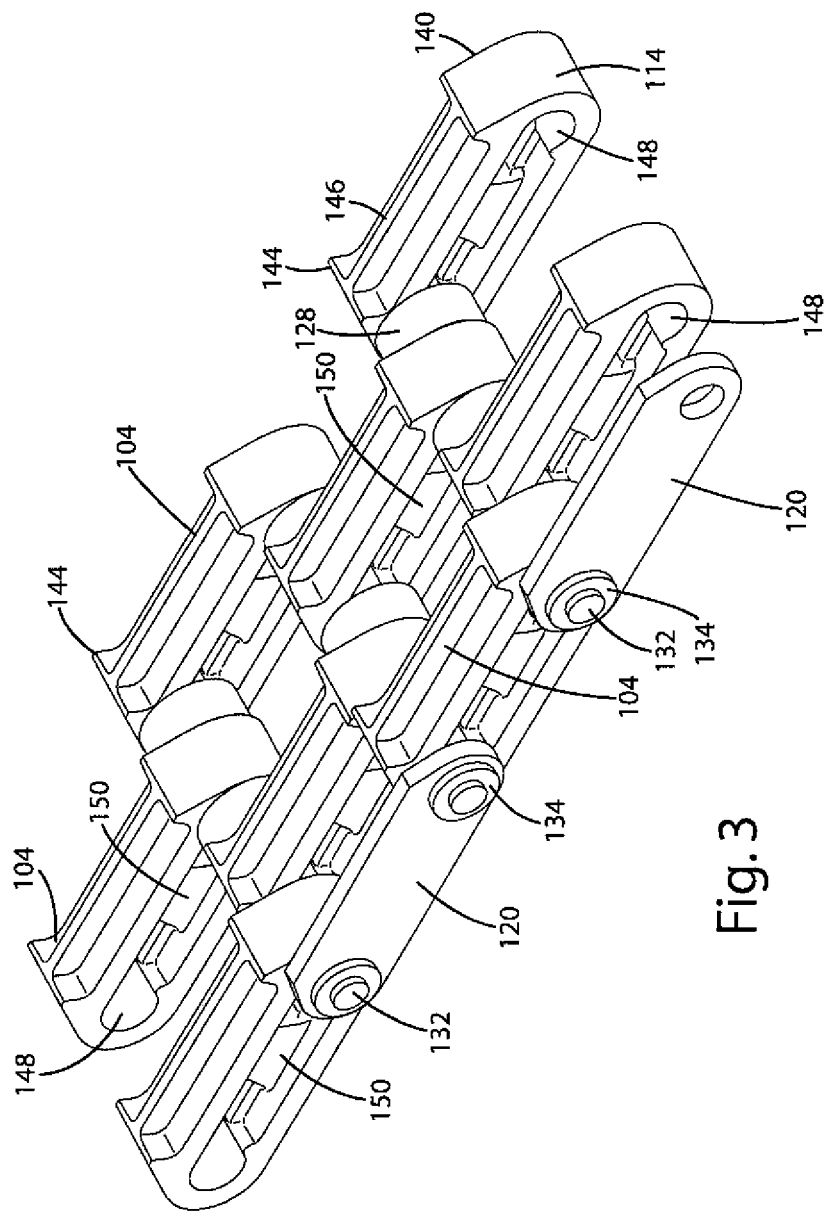
FIG. 3 is an upper, perspective view of the belt section shown in FIG. 2.
Figure 4:
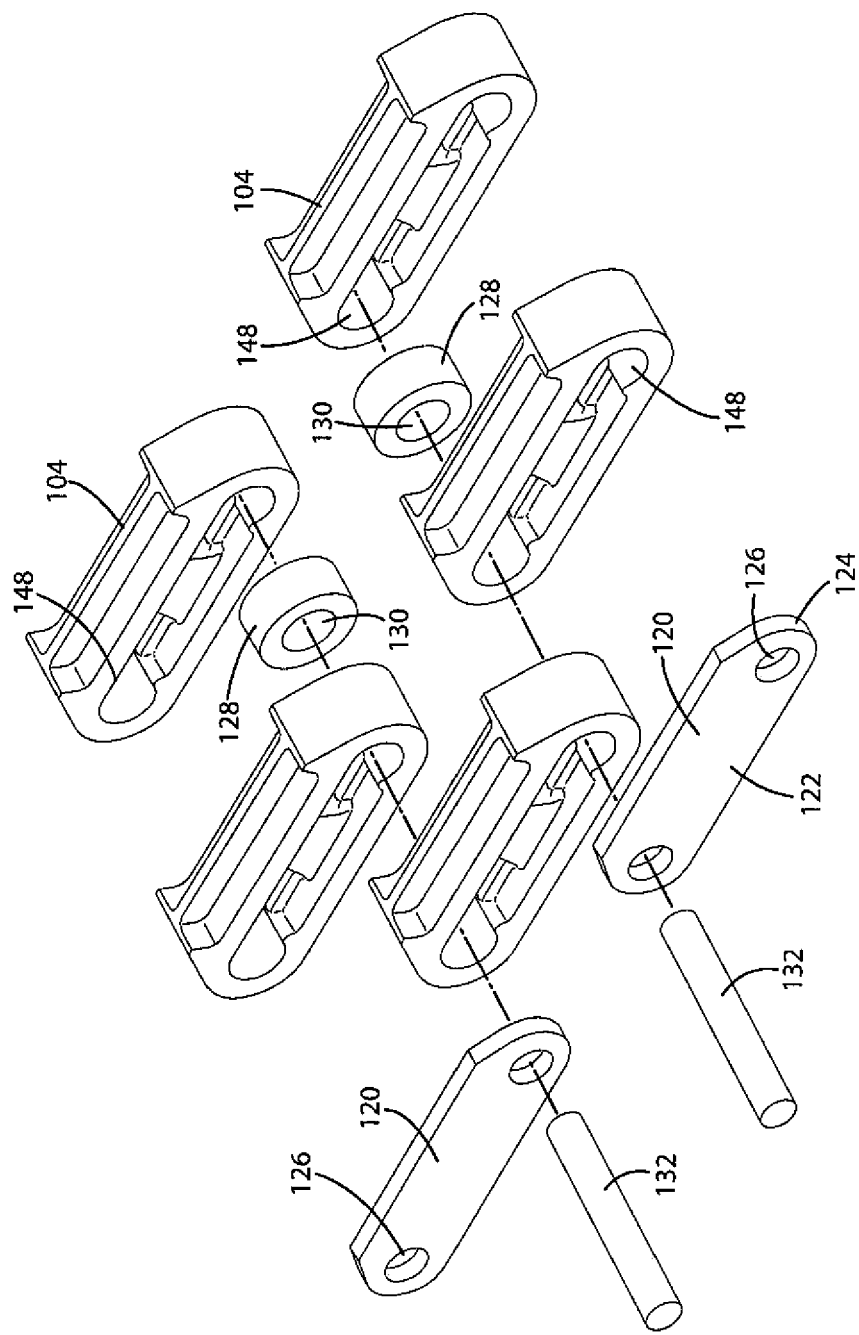
FIG. 4 is a perspective and exploded view of the belt section shown in FIGS. 2 and 3.
Figure 5:
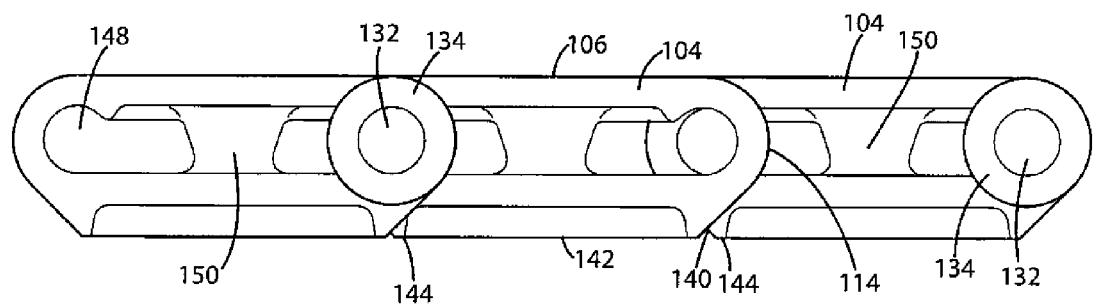
FIG. 5 is a side, elevation view of the belt section, showing the roller configuration.

In addition to the aforedescribed elements, the belt section 102 also includes a series of alloy pins 132. The alloy pins 132 are particularly shown in FIG. 4 and are of a cylindrical configuration. As shown primarily in FIGS. 2, 3 and 4, the pins 132 are utilized to secure together the rollers 128, alloy side links 120 and alloy center links 104. Where the pins extend through to the side links 120, pin connectors 134 can be utilized to secure the pins in an appropriate manner. As also shown in FIGS. 2, 3 and 4, the alloy pins 132 will extend through the apertures 130, 126 and 116.

In accordance with the foregoing, the belt section 102 can be formed. It should be emphasized that the width of the belt section 102 can be adjusted as desired by adding or subtracting the individual elements of the belt sections 102.

It will be apparent to those skilled in the pertinent arts that other embodiments of link belts in accordance with the invention may be designed. That is, the principles of the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. A link belt for use in a centering furnace, said link belt comprising:
a plurality of first links, each of said links comprising working surfaces for supporting objects to be carried on said belt;
a plurality of rollers positioned intermediate certain of said first links;
a plurality of pins received through apertures within said first links and within said rollers;
each of said first links comprises a top section having opposing ends and a bottom section having opposing ends, said bottom section being spaced apart from said top section, and said top section and said bottom section of each of said first links being jointed at said ends by noses;
said top section of said first links comprises:
a main body;
a longitudinal member substantially narrower than the width of said top section main body, and extending upwardly from said main body; and
lateral members extending upwardly from said main body at the end of said longitudinal member, said upper surfaces of said longitudinal and lateral members defining said work surfaces;
each of said first links further comprises a center post joining said top and said bottom sections of said first link;
each of said bottom sections comprises a main body, with said main bodies of said top section and said bottom section having comparable dimensions;
each of said first links comprises a main body, with said main bodies of said top section and said bottom section having comparable dimensions; and
each of said first links comprises ribs projecting upwardly from said main body of said bottom section, and extending from said center post to said noses.

2. A link belt for use in a centering furnace, said link belt comprising:
a plurality of first links, each of said links comprising working surfaces for supporting objects to be carried on said belt;
a plurality of rollers positioned intermediate certain of said first links;
a plurality of pins received through apertures within said first links and within said rollers;
each of said first links comprises:
a top section;
a pair of opposing noses integral with or otherwise connected to said top section, said noses comprising a first end section and a second end section;
said first end section and said second end section each comprise an arcuate section curving inwardly toward a center of said top section; and
straight sections formed at said ends of said arcuate sections, said straight sections terminating in working surfaces formed at the top of lateral members of each of said first links.

3. A link belt in accordance with claim 2, characterized in that for each of said first links said arcuate sections define said apertures for said pins.

* * * * *